(No Model.)
F. A. IVES.
METALLIC PACKING.
No. 518,844.  Patented Apr. 24, 1894.
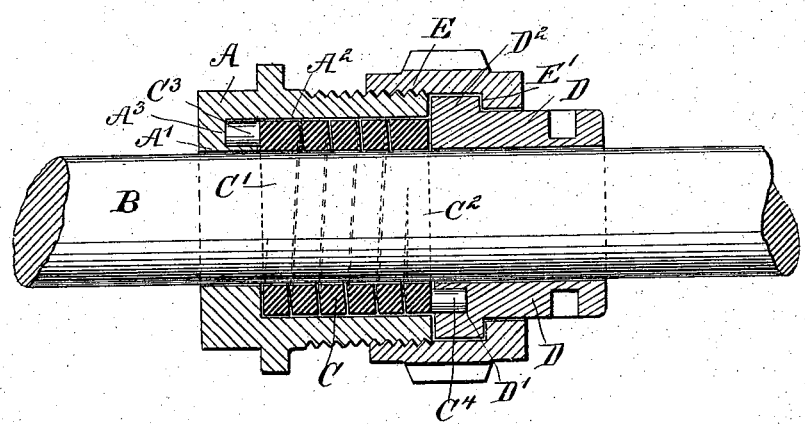
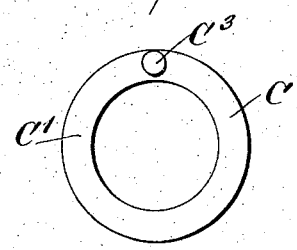
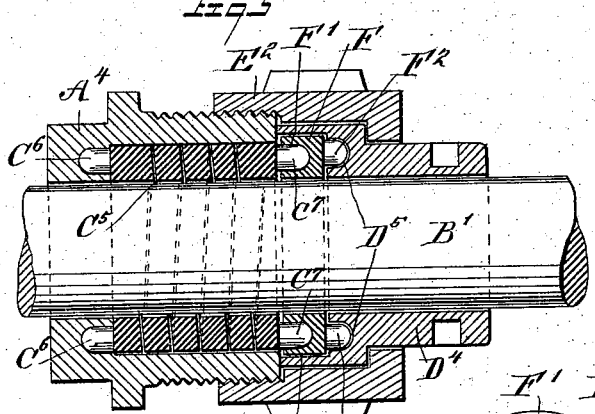
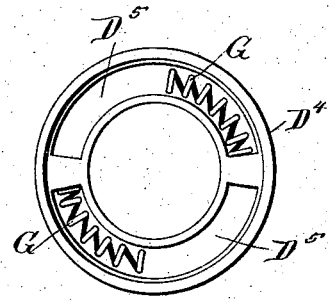
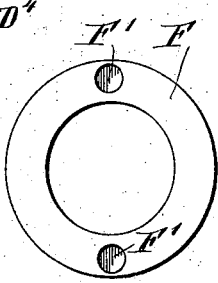
WITNESSES:
H. Walker
C. Sedgwick
INVENTOR
F. A. Ives
BY Munn & Co.
ATTORNEYS.

UNITED STATES PATENT OFFICE.

FREDERICK ARTHUR IVES, OF GRANT'S PASS, OREGON.

METALLIC PACKING.

SPECIFICATION forming part of Letters Patent No. 518,844, dated April 24, 1894.

Application filed September 8, 1893. Serial No. 485,059. (No model.)

*To all whom it may concern:*

Be it known that I, FREDERICK ARTHUR IVES, of Grant's Pass, in the county of Josephine and State of Oregon, have invented a new and Improved Metallic Packing, of which the following is a full, clear, and exact description.

The object of the invention is to provide a new and improved metallic packing, which is simple and durable in construction, and more especially designed to properly pack piston rods, valve stems, &c.

The invention consists of a coil forming the packing and having uncut ends forming steam-tight bearing faces.

The invention also consists of certain parts and details, and combinations of the same, as will be fully described hereinafter and then pointed out in the claims.

Reference is to be had to the accompanying drawings, forming a part of this specification, in which similar letters of reference indicate corresponding parts in all the figures.

Figure 1 is a sectional side elevation of the improvement. Fig. 2 is a face view of the coil. Fig. 3 is a sectional side elevation of the improvement as arranged for large sized stuffing boxes. Fig. 4 is a face view of the spring pressed gland for the modified form shown in Fig. 3; and Fig. 5 is a face view of the collar employed in connection with the same.

The packing, as illustrated in Fig. 1, is provided with a stuffing box casing A secured in the usual manner on the cylinder head, steam chest, &c., and is formed with two bores A' and $A^2$, of which the smaller bore A' forms a passage for the piston rod, valve stem or other rod B. In the larger bore $A^2$ is placed a packing formed of a coil C having uncut ends C' and $C^2$, the said packing being made of a suitable set material which has sufficient tensile strength for closing the coil, and is not sufficiently soft to form a good bearing surface for the rod B. On the uncut end C' of the coil C is arranged a longitudinally extending pin $C^3$, engaging a correspondingly shaped recess $A^3$, formed in the bottom of the casing A, and a similar pin $C^4$ extends from the other uncut end $C^2$ and engages a correspondingly shaped recess D' formed on the inner face of the gland D, fitted loosely on the rod B.

The gland D is provided with an angular shoulder $D^2$, engaged by a corresponding shoulder E' formed internally on the nut E, screwing on the threaded portion of the casing A. The faces of the uncut ends C' and $C^2$ are seated snugly on the bottom of the casing A and the inner face of the gland D respectively, whereby steam-tight joints are formed between the coil, the bottom of the casing A, and the gland D.

In order to tighten the coil C on the rod B the operator engages the outer end of the gland D by a suitable tool, such as a spanner, to hold the gland in position while unscrewing the nut E, and then the operator moves the spanner so as to turn the gland D to tighten the coil C on the rod B, after which the nut is screwed up to firmly engage the shoulder $D^2$ of the gland, the latter being meanwhile securely held in place by the spanner.

If the improvement is applied on larger stuffing boxes, as shown in Figs. 3 and 4, then the uncut ends of the coil $C^5$ are provided with two or more pins $C^6$ and $C^7$, of which the pins $C^6$ engage corresponding recesses in the bottom of the casing A, and the other pins $C^7$ engage corresponding recesses F' in a collar F fitted loosely in a recess $D^3$ formed on the inner face of the gland $D^4$. On the opposite face of the collar F are arranged pins $F^2$, fitting into segmental recesses $D^5$ arranged in the gland $D^4$ next to the recess $D^3$, see Fig. 4. In the segmental recesses $D^5$ are placed coil springs G, pressing with their free ends on the pins $F^2$, so as to make a yielding connection between the collar F and the gland D, and consequently between the latter and the coil $C^5$. The nut $E^2$ screws on the casing $A^4$ and engages the gland $D^4$ in the same manner as above described relative to Fig. 1. It will be seen that by this arrangement the coil $C^5$ can be firmly pressed in contact with the rod B', so as to form a tight joint, at the same time establishing a yielding connection between the coil and the gland $D^4$ held in place by the nut $E^2$, so as to permit the gland to give slightly whenever it is necessary.

It will be seen that this packing is very simple and durable in construction and is readily applicable to large or small stuffing boxes.

Having thus described my invention, what I claim as new, and desire to secure by Letters Patent, is—

1. A metallic packing provided with a coil having uncut ends forming steam-tight bearing faces, substantially as described.

2. A metallic packing provided with a coil having uncut ends forming bearing faces, and pins extending from the faces of the said ends, substantially as described.

3. A metallic packing comprising a coil having uncut ends provided with pins, of which the pins at one end engage recesses in the fixed casing, a gland having recesses engaged by the pins in the outer ends of the coil, and a nut screwing on the casing and engaging the said gland to hold the latter in place, substantially as described.

4. A metallic packing comprising a casing, a coil held in the said casing and provided with pins engaging recesses in the bottom of the casing, a gland abutting on the said casing, a nut for holding the gland in place, and a yieldingly mounted collar in the said gland and connected with the said coil, substantially as shown and described.

FREDERICK ARTHUR IVES.

Witnesses:
P. W. ELLIS,
H. O. ROTERMUND.